United States Patent [19]

Lagger et al.

[11] Patent Number: 4,532,638
[45] Date of Patent: Jul. 30, 1985

[54] METHOD AND APPARATUS FOR THE EXPONENTIATION OF LARGE BINARY NUMBERS IN A RESIDUE CLASS MODULO N, PARTICULARLY FOR ENCODING AND DECODING DIGITALLY-REPRESENTED MESSAGES

[75] Inventors: Helmut Lagger, Ottobrunn, Fed. Rep. of Germany; Elisabeth Schmid, Mauerkirchen; Erich Haider, Linz, both of Austria

[73] Assignee: Siemens Aktiengesellschaft, Berlin & Munich, Fed. Rep. of Germany

[21] Appl. No.: 400,996

[22] Filed: Jul. 23, 1982

[30] Foreign Application Priority Data

Sep. 29, 1981 [DE] Fed. Rep. of Germany ....... 3138698

[51] Int. Cl.³ .................. H03K 13/00; G06F 7/52
[52] U.S. Cl. .......................... 375/17; 340/347 DD; 364/746
[58] Field of Search ........... 375/17, 27; 340/347 DD; 364/735, 739, 746, 754

[56] References Cited

U.S. PATENT DOCUMENTS

| | | | |
|---|---|---|---|
| 4,064,400 | 12/1977 | Akushsky et al. | 364/746 |
| 4,107,783 | 8/1978 | Huang | 364/746 |
| 4,281,391 | 7/1981 | Huang | 340/347 DD |
| 4,346,451 | 8/1982 | Katayama | 364/746 |

OTHER PUBLICATIONS

Lagger et al., "Sicherheitsaspekte in Rechnergesteuerten Kommunikationssystemen", Elektronische Rechenanlagen, vol. 6, Jan. 22, 1980, pp. 276–280.

*Primary Examiner*—Robert L. Griffin
*Assistant Examiner*—Stephen Chin
*Attorney, Agent, or Firm*—Hill, Van Santen, Steadman & Simpson

[57] ABSTRACT

A method and apparatus provides for exponentiation of large binary numbers in a residue class modulo N, particularly for encoding and decoding digitally-represented messages, in which the exponentiation comprises repeated scoring/multiplication cycles with a residue formation. The method provides that, respectively, one squaring/multiplication operation and one residue formation operation are executed nearly time-parallel and that the respective residue formation is undertaken by multiplication with a determined matrix.

6 Claims, 7 Drawing Figures

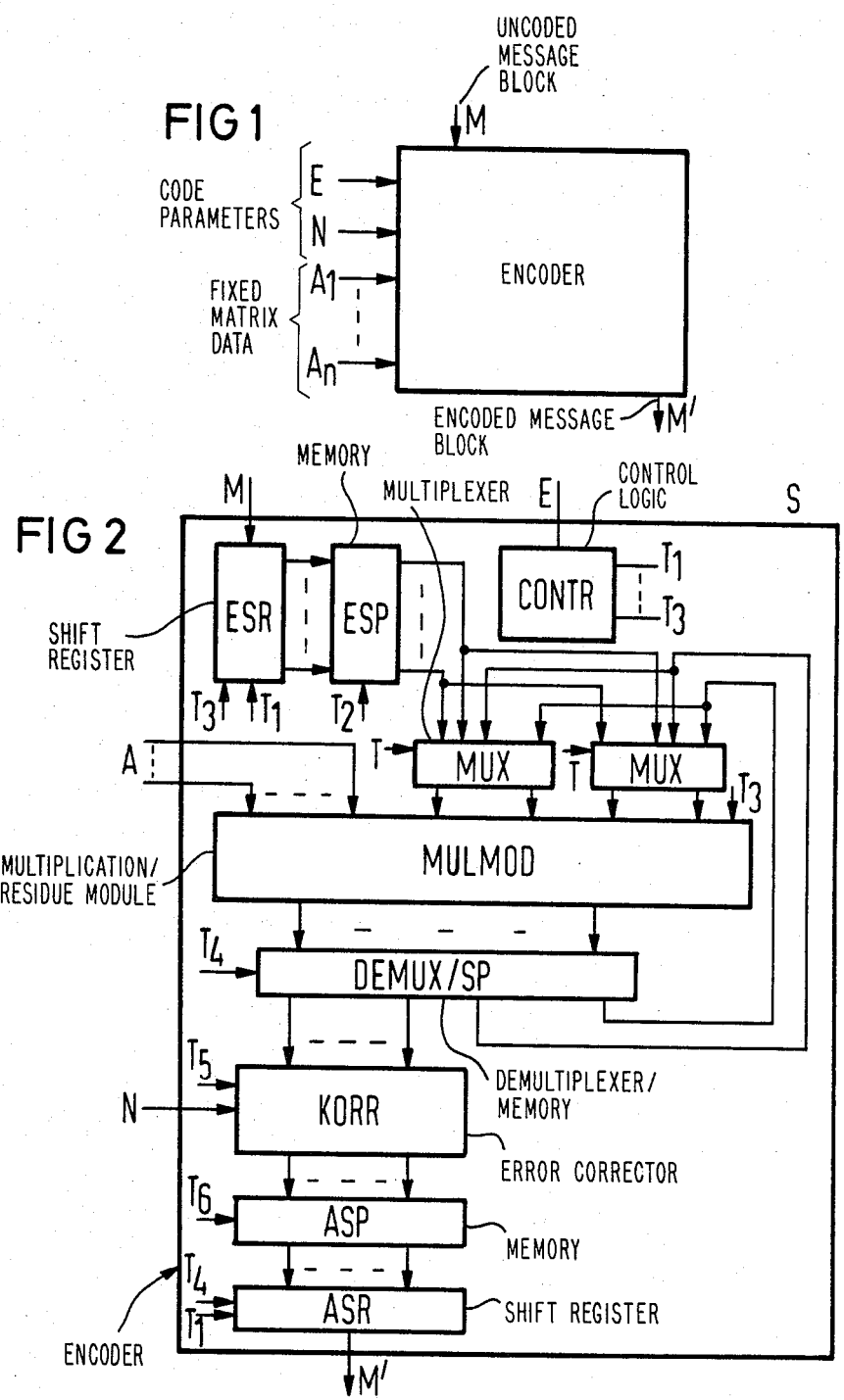

METHOD AND APPARATUS FOR THE EXPONENTIATION OF LARGE BINARY NUMBERS IN A RESIDUE CLASS MODULO N, PARTICULARLY FOR ENCODING AND DECODING DIGITALLY-REPRESENTED MESSAGES

BACKGROUND OF THE INVENTION

1. Field of the Invention

The present invention relates to a method and to apparatus for the exponentiation of large binary numbers in a residue class modulo N, particularly for encoding and decoding digitally represented messages, wherein the exponentiation comprises repeated squaring/multiplication cycles having respective remainder formation.

2. Description of the Prior Art

By the representation of messages, particularly speech, in the field of telephone switching and telephone transmission technology, for example in so-called packet switching and transmission devices, the simple possibility exists per se of encoding the digital message at the transmission side, transmitting the message in encoded form, and decoding the message at the receiving side, whereby the message can be protected against eavesdropping.

Methods for encoding digital messages are already known in the art. For this purpose, for example, an encoding method having an underlying encoding algorithm has been proposed, along with other proposals, in the publication Elektronisch Rechenanlagen, Vol. 22, 1980, No. 6, pp. 276-280, H. Lagger, C. Müller, H. Unterberger: "Sicherheitsaspekte in rechnergesteuerten Kommunikationssystemen", by means of which the message blocks to be formed, which basically represent large binary numbers, are encoded and decoded by a complicated conversion process.

The execution of such methods has heretofore been generally carried out by program-controlled computers. Such a solution, however, has the disadvantage that it has a long processing time due to its inherent complexity, so that an operation of an arrangement for the execution of the method does not permit a real time processing as necessary, for example, for the transmission of speech. On the contrary, such arrangements are exclusively suited for processing and transmitting messages which are not subject to the real time condition such as, for example, text, data of various types to be evaluated over a long interval, etc.

The high time expense which encumbers known arrangements is essentially to be attributed to the fact that the appertaining algorithm must be, for an effective encoding which offers high secrecy protection, respectively applied to a large plurality of binary places which are to be encoded in a message block. The known R.S.A. algorithm, cf. Electronische Rechenanlagen, Vol. 22, 1980, No. 6, essentially provides that the message to be encoded is exponentiated with a specific key having a subsequent remainder formation, whereby the remainder formation is carried out by a division by a fixed number. The exponentiation is based on multiplication processes. The residue formation can respectively occur after each multiplication operation.

In the known encoding methods, the multiplication operations, the multiplication operations and the residue formation operations are sequenced in chronological succession which, among other things, is based on the fact that the appertaining operations are sequenced by a digital computer which executes the operations successively in successive computer cycles.

SUMMARY OF THE INVENTION

The object of the present invention is to provide a method and an apparatus for the exponentiation of large binary numbers in a residue class modulo N which is particularly suited for encoding and decoding digitally-represented messages and in which the exponentiation comprises repeated squaring/multiplication cycles with a residue formation. The method is meant to make it possible to encode or, respectively, to decode messages, particularly speech, on a quasi-real time. To this end, it is necessary that the encoding operation or, respectively, the decoding operation, can be executed significantly faster than is the case in the known encoding systems on the basis of exponent residues.

The present invention is based on the perception that each individual step for the computational operations must be significantly shortened in comparison to the known method so that the time expense for the overall plurality of steps is also significantly shortened.

In order to achieve the aforementioned object, according to the present invention it is provided that a respective multiplication operation and a residue formation operation are executed nearly time-parallel and that the respective residue formation is undertaken by a multiplication by means of a matrix once determined.

The invention offers the advantage that a residue formation can respectively already be initiated when a first sub-result of a multiplication exists.

BRIEF DESCRIPTION OF THE DRAWINGS

Other objects, features and advantages of the invention, its organization, construction and mode of operation will be best understood from the following detailed description, taken in conjunction with the accompanying drawings, on which:

FIG. 1 is a schematic block diagram of a circuit arrangement for implementing the method, to which an uncoded message block M is serially supplied bit-by-bit over a message input and from which an encoded block M' is serially output bit-by-bit over a message output and into which code parameters E and N, as well as matrix lines $A_1 \ldots A_n$ determined for the residue formation are input over further inputs, the term "matrix" here meaning calculation data which are derived from the code parameter N;

FIG. 2 is a detailed block diagram of the circuit arrangement of FIG. 1;

DESCRIPTION OF THE PREFERRED EMBODIMENTS

Figure 3:
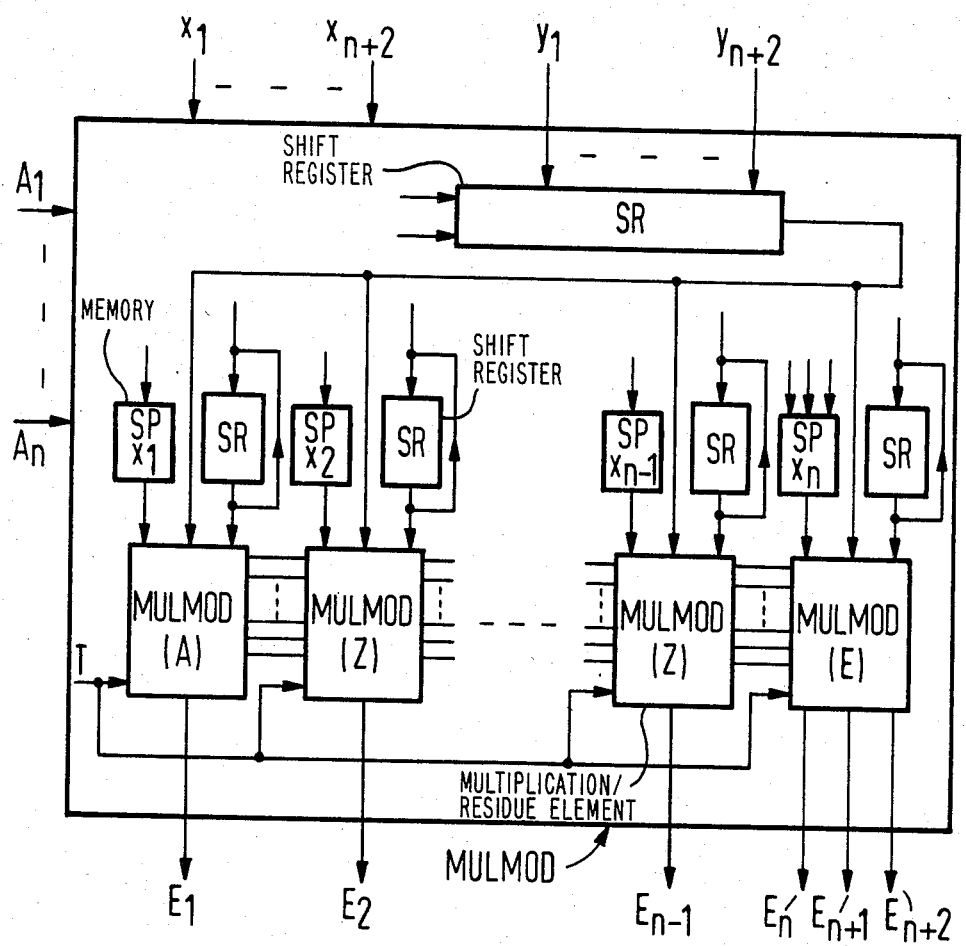
FIG. 3 is a schematic representation of an arrangement of multiplication/residue formation elements which form a multiplication/residue formation module of FIG. 2.
Figure 4:
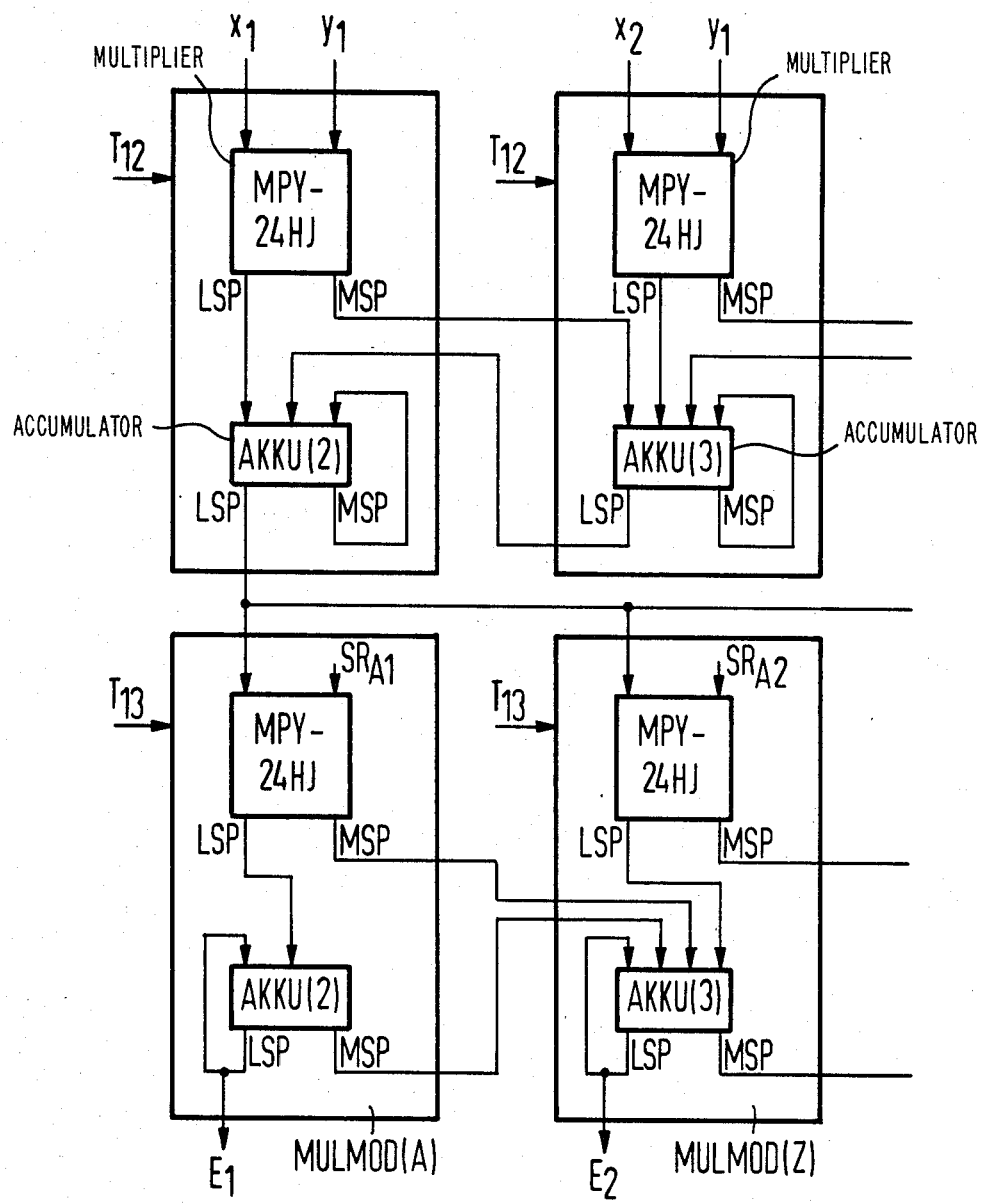
FIG. 4 is a schematic representation of the structure of a multiplication/residue formation elements as an initial element and the structure of a multiplication/residue formation element as a follower element, as well as their interconnection.
Figure 5:
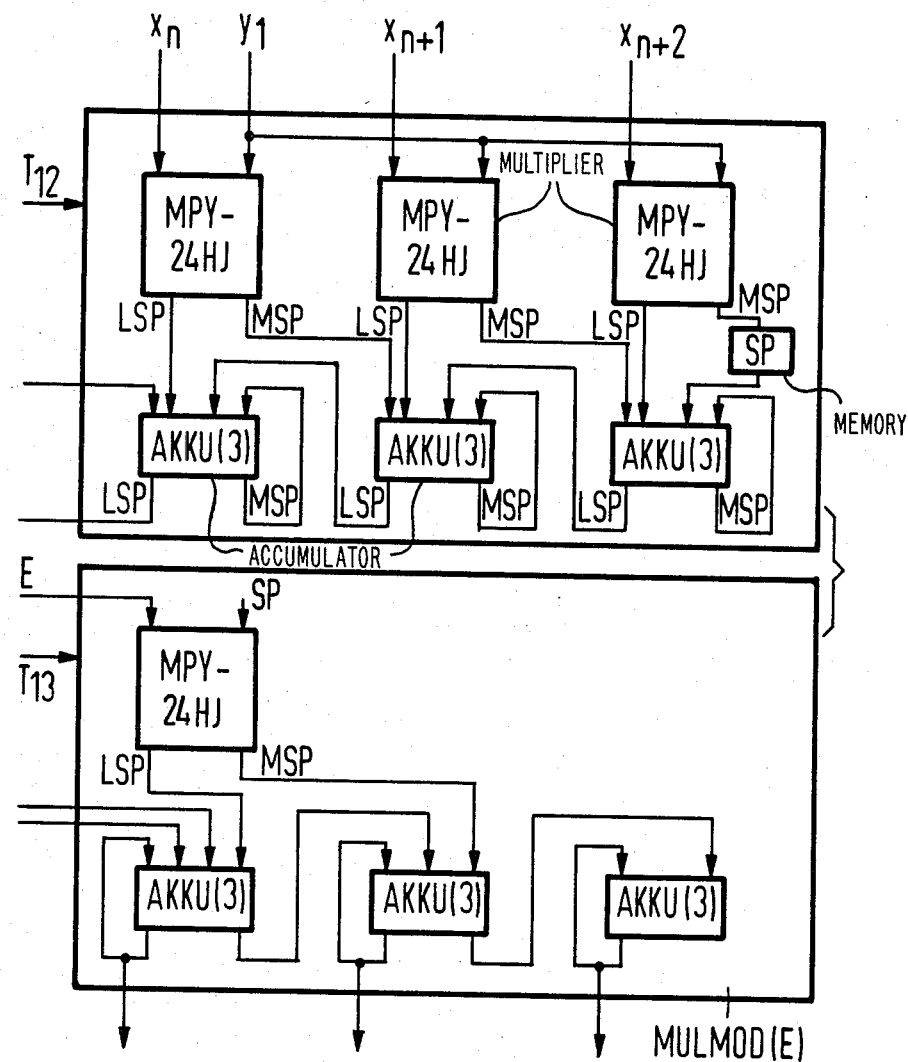
FIG. 5 is a schematic representation of the structure of a multiplication/residue formation element operating as a final element.

As set forth above, FIG. 1 schematically illustrates the overall circuit arrangement, constructed in accordance with the invention, for encoding a digitally-represented message comprising an input for an uncoded message block M, an output for an encoded message block M', further inputs for code parameters E, N and a plurality of lines $A_1 \ldots A_n$ of a matrix A derived from the code parameter N, the lines $A_1 \ldots A_n$ being determinate for the residue formation. As likewise already set forth, the uncoded message block M is serially input bit-by-bit over the input provided for that purpose. The encoded message block M', in the following also referred as a cryptogram block, is serially output over the appertaining output. A cryptogram block is formed in accordance with the law:

$$M' = M^E \bmod N.$$

Before proceeding further, a few preconditions are set forth below.

Number Representation

A, B, N are represented as numbers to the base $2^m$.

Multiplication A·B $$C = A \cdot B = \sum_{i=0}^{L} \sum_{k=0}^{P} a_l \cdot b_k \cdot 2^{(k+i) \cdot m}$$

The result of the multiplication is likewise represented to the base $2^m$. Therefore, the carries in the individual coefficients must be taken into consideration.

The coefficients $C_o \ldots C_{L+P+2}$ are successively generated in the hardware structure discussed below which is considered for the preferred exemplary embodiments.

Residue Formation C (mod N)

An algorithm which approximately calculates the residue C mod N is employed for the further processing of the results of the multiplication.

It is essential that:

The quotient is not calculated;

The algorithm can begin immediately after calculation of the first sub-result of the multiplication and ends only a sub-multiplication cycle (m×m bit) later than the multiplication (A·B); and Although the residue is only approximately calculated with the algorithm (residue exactly+T.N), wherein $$T < 2^{m + log_2(2k+3) + 1},$$

where $k = \log_2 N/m$, this can be employed without correction for the following multiplication/division cycle. The error does not build up during further steps. A correction (by simple adding and subtracting, plurality of steps $\leq m + \log_2(2 \cdot k + 3) + 1$) is necessary only at the end of the exponentiation.

The algorithm for the residue formation is based on a coefficient comparison. A matrix whose modified inverse can be calculated in advance for a code N can be derived from the comparison. The residue formation is then a multiplication of a known vector and that part of the modified inverse of the matrix which is determined for the residue formation.

Time Estimate for a Realizable Exemplary Embodiment

N ——→ 300 Bit

A,B ——→ 300 Bit m ——→ 24 Bit

When one multiplication cycle requires 200 ns, encoding and decoding times (without correction time) result therefrom for the R.S.A. system which correspond to a bit throughput rate of 100 kBit/s.

In the following, a detailed description of the circuit structures of a preferred exemplary embodiment of the circuit arrangement for implementing the method is provided on the basis of FIGS. 2-7.

The function modules is illustrated in FIG. 2 and comprises, as the heart of the arrangement, a MULMOD which is responsible for the attainable throughput rate whose function comprises multiplying and forming residues. This portion of the circuit arrangement is shown in greater detail in FIGS. 4-6.

In addition to the function module MULMOD, FIG. 2 further illustrates an input shift register ESR, a following input memory ESP, a plurality of multiplexers MUX and a control logic CONTR, all of which precede the function module MULMOD, as well as a demultiplexer/memory DEMUX/SP, a correction device KORR, an output memory ASP, and an output shift register ASR, of which follow the function module MULMOD. A respective message block M to be encoded is serially, preferably bit-by-bit, supplied to the input shift register ESR, the message block M then being read into the input memory ESP from the signal outputs of the input shift register ESR. Inversely, a cryptogram block M' is serially emitted, again preferably bit-by-bit, from the output shift register ASR, after having been previously supplied time-parallel to the output shift register ASR from the output memory ASP. The input memory ESP supplies the data of the uncoded message block to a plurality of multiplexers MUX whose outputs are connected to the function module MULMOD. The line signals of the matrix A are also supplied to the function module MULMOD for the purpose described above. The control logic CONTR receives one of the encoding parameters, namely the parameter E, in order to generate a plurality of different, non-illustrated clock signals $T_1 \ldots T_k$. The signal outputs of the function module MULMOD are connected to the aforementioned demultiplexer/memory DEMUX/SP whose signal outputs are connected to signal inputs of the correction device KORR. The second encoding parameter N is supplied to the correction device KORR over a further input. The signal outputs of the correction device KORR are connected to the inputs of the output memory ASP.

FIG. 3, as mentioned above, illustrates the disposition of multiplication/residue formation elements of which the multiplication/residue formation module (or function module) MULMOD of FIG. 2 is composed. Further, FIG. 3 illustrates the devices belonging to the elements MULMOD (A), MULMOD (Z) . . . for the drive of such elements, namely a memory SPx₁ and a shift register SR for the first element, a shift register SR and a memory SPx₂ for the second element, and similar devices for the remaining elements including the $n-1^{th}$ element and the $n^{th}$ element. Moreover, a central shift register SR is provided whose signal output is connected to all the elements of the function module MUL-MOD.

A respective element assumes a part of the overall operation of the module MULMOD. The number of elements depends on the type of multiplier employed in these elements, as well as on the magnitude of the number N. The internal structure of such an element, as already set forth above, is illustrated in detail in FIG. 4. As can be seen from FIG. 4, each element comprises two sub-units which respectively exhibit a multiplier and an accumulator, both of which are known per se. For example, the module MPY-24HG can be selected as a typical multiplier. As proceeds from FIG. 4 and FIG. 5, deviations from the standard circuit for an intermediate element MULMOD (Z) should be undertaken for the input or, respectively, the final element MULMOD (A) or, respectively, MULMOD (E).

Figure 6:
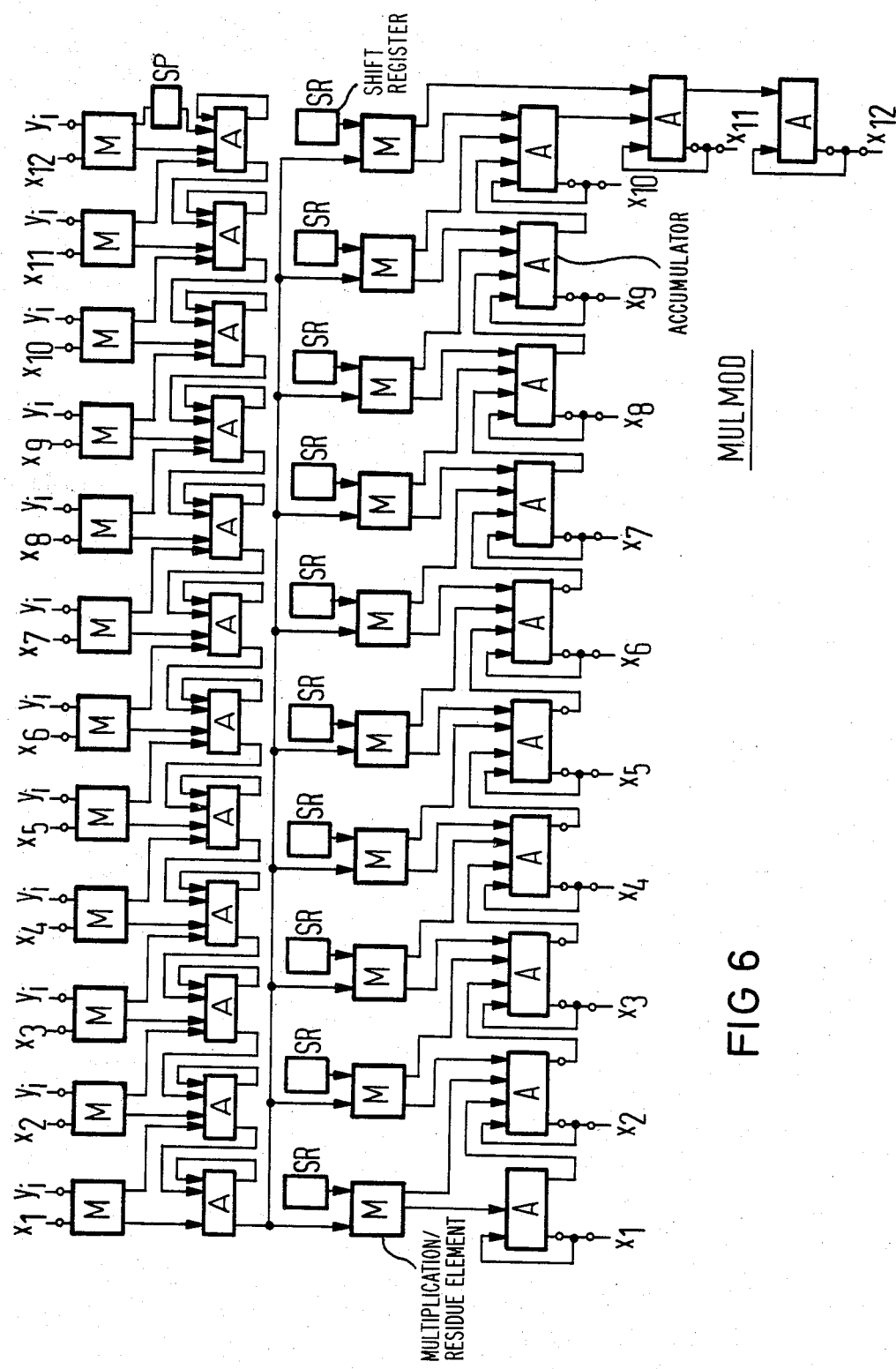
FIG. 6 is a schematic representation of the overall structure of a multiplication/residue formation circuit arrangement.

As briefly set forth above, FIG. 6 schematically illustrates the overall structure of a multiplication/residue formation circuit arrangement, namely of the module MULMOD. As can be derived from the drawing, the module MULMOD comprises a plurality of identical elements as are illustrated in detail in FIGS. 4 and 5 and which are interconnected in the illustrated manner. For the sake of brevity and clarity, abbreviated characters, namely M,A, have been selected for the individual subdevices of the elements.

Figure 7:
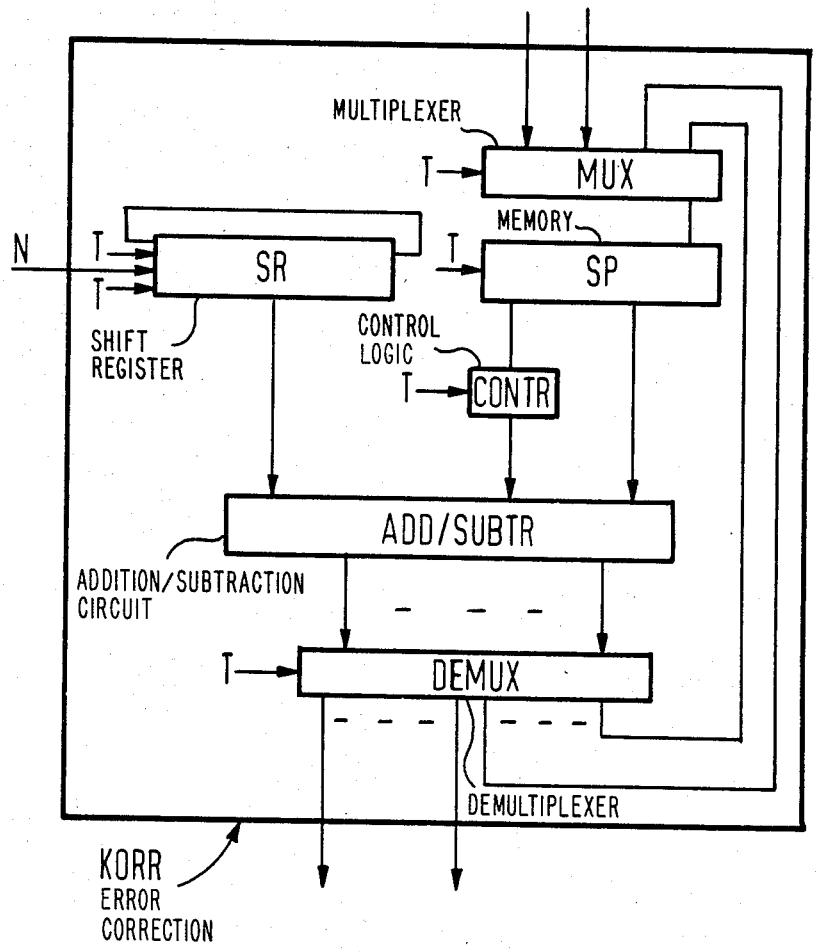
FIG. 7 is a block diagram illustration of a correction device which is connected to the multiplication/residue formation circuit arrangement.

FIG. 7 illustrates the correction device in block diagram form, the correction device being actively connected to the multiplication/residue formation circuit arrangement, namely as the correction device KORR. The correction device, again, contains a plurality of individual modules, namely a multiplexer MUX at the input, followed by a memory SP, a shift register SR for the serial acceptance of the encoding parameter N, a control logic CONTR for generating the various clock signals, a combined addition/subtraction circuit ADD-/SUBTR, and a demultiplexer DEMUX which is connected to the output of the correction device KORR.

As set forth above, the time-saving encoding or, respectively, decoding of digitally-represented messages can be carried out in comparison to techniques known in the art, by the method of the present invention which is preferably realizable by the circuit arrangement illustrated on the drawings, so that a quasi-real time mode is possible according to the aforementioned value for the bit throughput rate.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. Apparatus for exponentiating large numbers in a residue class modulo N for encoding and decoding digitally-represented messages, comprising:
   an input shift register including an input for serially receiving a message block and a plurality of parallel outputs for providing the message block in parallel;
   an input memory for storing message blocks, including a plurality of inputs connected to said outputs of said input shift register and a plurality of outputs;
   a plurality of multiplexers each including a plurality of inputs connected to respective outputs of said input memory, and a plurality of outputs;
   a multiplication/residue formation module including a plurality of first inputs connected to said outputs of said multiplexers, a plurality of second inputs for receiving matrix division data, and a plurality of outputs, said multiplication/residue formation module operable to cyclically alter the message blocks received from said multiplexers in accordance with the matrix division data and provide a residue;
   demultiplexing means including a plurality of inputs connected to said outputs of said multiplication/residue formation module, and a plurality of outputs;
   a correction device including a plurality of inputs connected to said outputs of said demultiplexing means, a plurality of outputs and a correction parameter input, and operable to correct the residue;
   an output memory including a plurality of inputs connected to said outputs of said correction device, and a plurality of outputs;
   an output shift register including a plurality of inputs connected to said outputs of said output memory, and an output for providing altered message blocks bit-by-bit serially from said apparatus; and
   control logic means for producing clock signals including a plurality of outputs for emitting said clock signals connected to said input shift register, to said input memory, to said multiplexers, to said multiplication/residue module, to said demultiplexing means, to said correction device, to said output memory and to said output shift register, and an input for receiving an encoding parameter to cause generation of said clock signals.

2. The apparatus of claim 1, wherein said multiplication/residue formation module comprises:
   a plurality of multiplication/residue formation elements connected and driven in a chain including a beginning element, intermediate elements, and a final element.

3. The apparatus of claim 2, wherein each of said elements comprises:
   a multiplier;
   a shift register; and
   a memory.

4. A method of exponentiating large binary numbers A and B, in a residue class modulo N for encoding and decoding digitally-represented messages, comprising the steps of:
   repetitively exponentiating a binary number in a plurality of squaring/multiplication cycles having residue formation;
   each of the cycles comprising the step of multiplying the numbers A and B which are numbers to the base $2^m$ and the step of forming a residue nearly time-parallel with the step of multiplying;
   said step of forming a residue including a step of multiplying in accordance with a fixed matrix;

dividing a message into a plurality of message blocks; and respectively encoding, transmitting and decoding the message blocks individually.

5. A method of exponentiating large binary numbers A and B, in a residue class modulo N for encoding and decoding digitally-represented messages, comprising the steps of:

repetitively exponentiating a binary number in a plurality of squaring/multiplication cycles having residue formation;

each of the cycles comprising the step of multiplying the numbers A and B which are numbers to the base $2^m$ and the step of forming a residue nearly time-parallel with the step of multiplying;

said step of forming a residue including a step of multiplying in accordance with a fixed matrix;

serially feeding an uncoded message block bit-by-bit to an encoder;

feeding specific code parameters to the encoder;

feeding matrix data to the encoder, including deriving the matrix data from the inverse of the matrix and a predetermined one of the specific code parameters;

encoding the message by the repetitive exponentiating steps; and serially reading, bit-by-bit, the encoded message block from the encoder.

6. A method of exponentiating large binary numbers A and B, in a residue class modulo N for encoding and decoding digitally-represented messages, comprising the steps of:

repetitively exponentiating a binary number in a plurality of squaring/multiplication cycles having residue formation;

each of the cycles comprising the step of multiplying the numbers A and B which are numbers to the base $2^m$ and the step of forming a residue nearly time-parallel with the step of multiplying;

said step of forming a residue including a step of multiplying in accordance with a fixed matrix;

serially feeding a coded message block bit-by-bit to a decoder;

feeding specific code parameters to the decoder;

feeding matrix data to the decoder, including deriving the matrix data from the inverse of the matrix and a predetermined one of the specific code parameters;

decoding the message by the repetitive exponentiating steps; and serially reading, bit-by-bit, the decoded message block from the decoder.

* * * * *